United States Patent
Dulac et al.

(10) Patent No.: US 8,248,062 B2
(45) Date of Patent: Aug. 21, 2012

(54) ROTATIONAL DIRECTION DETECTOR AND METHOD FOR DETERMINING THE DIRECTION OF ROTATION OF A WHEEL

(75) Inventors: Gilles Dulac, Villeneuve Tolosane (FR); Alexander Fink, Regensburg (DE); Thomas Haas, Donaustauf (DE); Gregor Kuchler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 366 days.

(21) Appl. No.: 12/555,419

(22) Filed: Sep. 8, 2009

(65) Prior Publication Data

US 2010/0060262 A1 Mar. 11, 2010

(30) Foreign Application Priority Data

Sep. 8, 2008 (DE) .......................... 10 2008 046 270

(51) Int. Cl.
*G01P 3/52* (2006.01)
(52) U.S. Cl. ....................................... 324/165; 324/173
(58) Field of Classification Search .......... 324/649–718, 324/160–180; 33/300–336
See application file for complete search history.

(56) References Cited

U.S. PATENT DOCUMENTS

| 6,828,781 | B1 * | 12/2004 | Butzmann ................ 324/207.19 |
| 2002/0047715 | A1 * | 4/2002 | Holm ............................ 324/683 |
| 2004/0159158 | A1 | 8/2004 | Forster |
| 2005/0194964 | A1 * | 9/2005 | Okada et al. .................. 324/165 |
| 2006/0132356 | A1 * | 6/2006 | Dulac ............................ 342/173 |
| 2007/0051187 | A1 * | 3/2007 | McDearmon ............ 73/862.322 |
| 2008/0297143 | A1 * | 12/2008 | Tanaka et al. ................. 324/173 |

FOREIGN PATENT DOCUMENTS

| DE | 3113538 A1 | 12/1982 |
| DE | 102004031810 A1 | 1/2006 |
| DE | 102004059165 A1 | 6/2006 |
| DE | 102006012534 A1 | 10/2006 |
| EP | 0760299 A1 | 3/1997 |
| EP | 1172656 A1 | 1/2002 |

\* cited by examiner

*Primary Examiner* — Huy Q Phan
*Assistant Examiner* — Temilade S Rhodes-Vivour
(74) *Attorney, Agent, or Firm* — Laurence A. Greenberg; Werner H. Stemer; Ralph E. Locher

(57) ABSTRACT

A rotational direction detector is specified which is provided for mounting to a circumferential segment of a wheel having at least one sensor, wherein a change in the output signal of the sensor occurs when the circumferential segment enters and/or leaves the wheel contact area. Furthermore a method is specified for determining the direction of rotation of a wheel, wherein the signal change is determined and a rotational direction signal is derived therefrom.

11 Claims, 2 Drawing Sheets

ROTATIONAL DIRECTION DETECTOR AND METHOD FOR DETERMINING THE DIRECTION OF ROTATION OF A WHEEL

CROSS-REFERENCE TO RELATED APPLICATION

This application claims the priority, under 35 U.S.C. §119, of German application DE 10 2008 046 270.5, filed Sep. 8, 2008; the prior application is herewith incorporated by reference in its entirety.

BACKGROUND OF THE INVENTION

Field of the Invention

The invention relates to a rotational direction detector which is provided for mounting on a circumferential segment of a wheel or to a tire. Furthermore the invention relates to a method for determining the direction of rotation of a wheel or a tire.

Wheel or tire control systems generally serve to monitor tire pressure in motor vehicles in order to enable early recognition of hazardous situations caused by faulty tires and hence prevent accidents from occurring. A distinction is made here between direct and indirect systems. Indirect systems do not measure the tire pressure itself but use the external diameter of the tire which is dependent on the tire pressure. In direct systems a sensor is affixed within the tire or on the valve of the tire which transmits the internal pressure and the temperature of the tire to a central system at defined intervals by radio transmission. The driver receives information about the current pressure value in plain text which is either visible to him all the time or can be called up by pressing a button. In addition to measuring the tire pressure, modern tire pressure systems are able to clearly identify a tire and determine the wheel load.

Usually a unique serial number is assigned to the sensors that is sent together with the transmission of a measurement value, so that from this serial number, the receiver can clearly assign the measurement values to a tire. In such cases it is sufficient for the serial numbers of the wheel built into a vehicle to be unique. If tires with ambiguous serial numbers are manufactured, when mounting the tires on a vehicle this fact might have to be taken into consideration.

From the serial number alone, however, as yet a particular installation position on the vehicle cannot be concluded which is why many vehicles are also equipped with a system for wheel localization. The object of the localization is to allocate an installation position to each serial number. This consequently enables measurement values to be assigned to a particular position on the vehicle and the driver is informed when a tire (pressure) problem occurs such as by a warning message "pressure drop, front left". Furthermore automatic wheel localization enables the correct mounting of the tires/wheels to be checked and in the event of an error issues a warning message to the driver. Mounting on both the correct axle and on the correct side is taken into consideration here. Examples of circumstances which can trigger a warning message are the mounting of frequently broader rear tires on the front axle and mounting in the wrong direction of rotation.

One possibility for localizing the tires/wheels consists in analyzing the direction of rotation of the wheel and drawing conclusions from the rotational direction as to the place where the wheel is mounted.

From European patent EP 0 760 299 such an apparatus is known for example for tire pressure control systems in motor vehicles with sensor devices on each wheel which transmit information to an evaluation device arranged in the vehicle. Each sensor device has a sensor to detect the direction of rotation of the wheel assigned thereto and transmits the information about the direction of rotation to the evaluation device.

Furthermore, from published, European patent application EP 1 172 656 A1, corresponding to U.S. patent publication No. 20020047715, such a sensor is known to determine the direction of rotation of an object, which sensor contains a first accelerometer for measuring accelerations in a first direction and a second accelerometer for measuring accelerations in a second direction. Both accelerometers are affixed to the object so that the first direction is not parallel to the second direction and neither of the two directions is parallel to the rotational axis of the object. When the object rotates, phase differences result from the measured accelerations which are used to determine the direction of rotation of the object.

SUMMARY OF THE INVENTION

It is accordingly an object of the invention to provide a rotational direction detector and a method for determining the direction of rotation of a wheel which overcome the above-mentioned disadvantages of the prior art methods and devices of this general type, which enables the rotational direction of a tire/a wheel to be determined easily. Within the context of the disclosure, only "wheels" are referred to hereinafter although the invention obviously also relates to tires in particular.

Accordingly there is provision for equipping a rotational direction detector which is provided for mounting on a circumferential segment of a wheel with at least one sensor, in which a change in the output signal of the sensor occurs when the circumferential segment enters and/or leaves the wheel contact area.

According to the invention, a method for determining the rotational direction of a wheel contains the steps of determining a signal change of at least one sensor arranged on a circumferential segment which occurs due to the circumferential segment entering and/or leaving the wheel contact area and deriving a rotational direction signal from the signal of the at least one sensor.

The advantage of the inventive rotational direction detector or the inventive method lies inter alia in that relatively simple sensors or a comparatively simple evaluation algorithm, may be used to determine the rotational direction of a wheel. Already available sensors which already serve another purpose, for example determination of the wheel load, can be used at the same time in synergy.

It should be pointed out again here that the invention is also related to tires as such and therefore is also to be read in the sense of "tire sensor, which is provided for mounting to a circumferential segment of a tire". The term "wheel" would then also have to be considered to be replaced by "tire" in the remaining part of the application.

As has already been mentioned in the introduction, from the knowledge about the rotational direction of a wheel conclusions can be drawn about the correct mounting on the vehicle. For example, the faulty mounting of a tire with preferred rotational direction, can be recognized from the fact that it is predominantly rotated in the "wrong" direction since vehicles predominantly move in the forward direction. Thus, for example, the number of turns in the respective rotational direction can be counted preferably within a specific time span. Finally with the aid of the inventive rotational direction detector the correct mounting of twin tires, i.e. "inside"/ "outside" in heavy goods vehicles can be monitored.

It is advantageous for example, when the at least one sensor outputs a changeable signal even when moving through the circumferential segment of the wheel contact area. The fact that in this case a signal remains available longer, namely while moving through the entire wheel contact area means that the analysis of the rotational direction of the wheel can also take place when the wheel only turns slightly, i.e. the rotational direction detector remains within the wheel contact area.

It is also advantageous if the rotational direction detector contains at least two identical sensors which lie behind one another in the circumferential direction in the mounted state of the rotational direction detector. In this case, the sensors can be constructed relatively simply since in principle the same binary signal is sufficient for detection of the rotational direction. Therefore microswitches can be provided for example.

It is furthermore particularly advantageous if the rotational direction detector contains a single sensor which has a characteristic that varies along the circumferential direction in the mounted state of the rotational direction detector. Since only one sensor is used, this makes mounting of such a rotational direction detector simpler. This also means that such a sensor is less prone to errors due to the reduced number of built-in parts. Furthermore such an arrangement is to be preferred if the wheel contact area is relatively small and it is difficult to implement two sensors at a distance from one another.

It is particularly advantageous if the at least one sensor is embodied such that it converts into electrical energy the deformation energy occurring when entering and/or leaving the wheel contact area and/or when moving through the wheel contact area. Here part of the considerable flexing which occurs in a tire is skimmed off so to speak and simultaneously used for the inventive rotational direction detector. In this way, in particular piezo sensors are available which can convert deformation energy into electrical energy. However, electromechanical systems are also conceivable.

It is favorable if an element from the following group— microcontact, variable resistor, variable capacitor, piezo element, acceleration sensor or collision sensor is provided as the sensor. These sensors are easy to acquire and comparatively failsafe because they have been used for many years. They are therefore particularly well suited to the harsh operating conditions inside a wheel or a tire.

It is furthermore favorable if sensors of varying construction are provided. Sensors have typical sensitivity established in their construction. Therefore it can arise that under particular operating conditions (e.g. tire temperature) one type of sensor does not issue a signal or does not issue a satisfactory signal whereas another type of sensor still issues a perfect signal. With the right "mix" of sensor types, however, a sufficient, reliable function of the rotational direction detector can be ensured over the whole range of operating conditions.

Finally it is also advantageous if the rotational direction detector additionally contains an evaluation unit which processes the signals from the sensors and derives therefrom a rotational direction signal. The sensor signals usually contain significantly more information than would be necessary for the rotational direction information "left" or "right". The evaluation unit therefore processes the comparatively complex sensor signals and passes on simplified information, namely the rotational direction. The processing in the electronics on board a motor vehicle connected downstream is therefore significantly reduced.

In the inventive method, it is advantageous for example if the signals of two sensors are phase-shifted and these are used for the determination of the rotational direction. Since the phase shifting of two signals generally has to be determined frequently, simple, i.e. integrated and hence cost-effective solutions are available. The mounting of such a rotational direction detector can therefore take place without major difficulties.

Finally it is also advantageous if the signal of a sensor is pulse-shaped and its absolute value has different gradients for rising and falling signal edges which are used to determine the rotational direction. Since here basically only one signal curve has to be considered (a duplication of this type of sensor is however definitely not excluded), another simpler type of electronic switch is used to analyze the signal/signals of the sensor/sensors.

Other features which are considered as characteristic for the invention are set forth in the appended claims.

Although the invention is illustrated and described herein as embodied in a rotational direction detector and a method for determining the direction of rotation of a wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
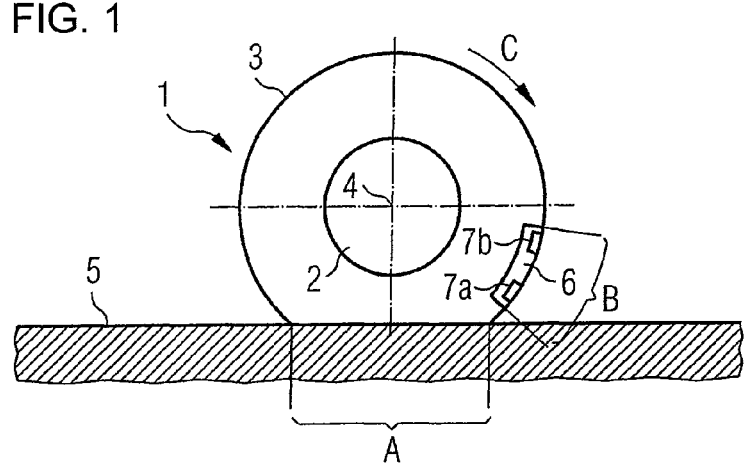
FIG. 1 is an illustration of a rotational direction detector in a built-in state.

In the figures of the drawing identical components and features and components and features having the same function are provided with the same reference numbers—unless stated otherwise.

Referring now to the figures of the drawing in detail and first, particularly, to FIG. 1 thereof, there is shown a wheel 1, which consists of a rim 2 and a tire 3 and can be positioned to rotate about an axle 4. The wheel 1 has contact with a road surface 5 and is deformed due to a load acting on the wheel 1, so that the contact between the wheel 1 and the road surface 5 takes place in a region of a wheel contact area A.

A rotational direction detector 6 is arranged in a wheel segment B which contains sensors 7a and 7b. The two sensors 7a and 7b are arranged behind one another in a circumferential direction C. In this example it is assumed that the sensors 7a and 7b take the form of piezo strips.

Figure 2A:
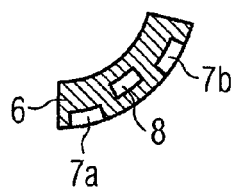
FIG. 2A is a diagrammatic, side sectional view of a rotational direction detector with sensors arranged behind one another.
Figure 2B:
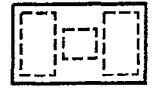
FIG. 2B is a diagrammatic, plan view of the rotational direction detector with the sensors arranged behind one another.

FIGS. 2A-2B show the rotational direction detector 6 of FIG. 1 in cross-sectional view and in plan view. Here two sensors 7a and 7b are embedded in a housing made for example of metal or plastic. In addition, an evaluation unit 8 is also arranged in the housing which picks up sensor signals 7a and 7b via wires (not shown). In principle, however, contactless pick-up of the signals is also possible.

Figure 3A:
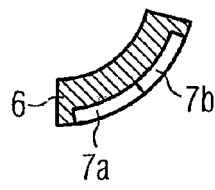
FIG. 3A is a side, sectional view of the rotational direction detector with the sensors arranged immediately behind one another.
Figure 3B:
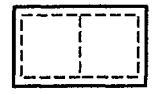
FIG. 3B is a plan view of the rotational direction detector with the sensors arranged immediately behind one another.

FIGS. 3A-3B show a further rotational direction detector 6 similar in configuration to the one shown in FIGS. 2A-2B. The sensors 7a and 7b are arranged here directly behind one another. For example these can be in the form of piezo strips on a common substrate.

Figure 4A:
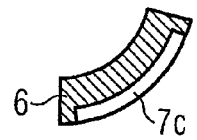
FIG. 4A is a side, sectional view of the rotational direction detector with a trapezoidal piezo pick-up.
Figure 4B:
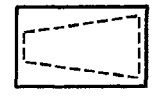
FIG. 4B is a plan view of the rotational direction detector with a trapezoidal piezo pick-up.

FIGS. 4A-4B shows a side view and a plan view of a configuration of the rotational direction detector 6 in which a single sensor 7c is provided which has a characteristic that varies along the circumferential direction C. This can be achieved for example in that a trapezoidal piezo strip is affixed to the tire 3 such that the narrow and the wide side of the trapezium are arranged behind one another in the circumferential direction C. It is clear here that obviously other shapes can also be selected. The rotational direction detector 6 is provided for mounting on/in the tire 3 as shown in FIG. 1. Instead of a piezo strip with varying breadth, a strip with varying thickness can also be used.

Figure 5:
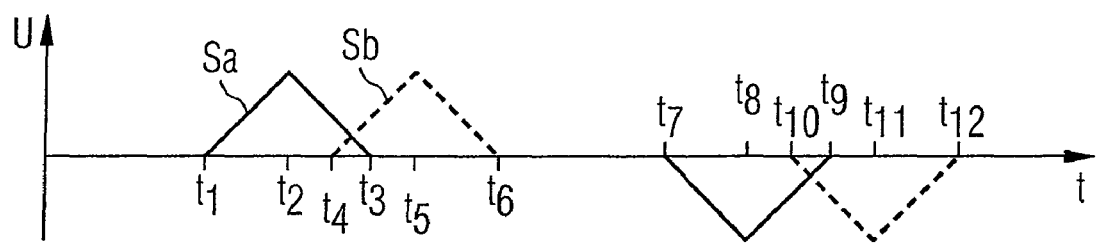
FIG. 5 is a graph showing a sensor signal curve for the rotational direction detector according to FIGS. 2 and 3.

In FIGS. 4A, 4B and 5 the evaluation unit 8 is disposed outside the actual rotational direction detector 6, such as on the rim 2. This means, however, that the evaluation unit 8 in the constructions illustrated in FIGS. 3A, 3B and 4 could definitely not be arranged in the same housing.

FIG. 5 shows signal curves Sa and Sb of the sensors 7a and 7b during rotation of the wheel 1 illustrated in FIG. 1. The function of the arrangement in FIG. 1 is now as follows. When the wheel 1 is rotated about the axle 4, the wheel segment B reaches the wheel contact area A at a time t1. At the time t1, a deformation of the first sensor 7a from an arc shape into a straight line begins. The signal Sa of the first sensor 7a now reaches a maximum at a time t2 when the first sensor 7b is half bent, half straight. The signal Sa falls off again with the same gradient up to time t3 where it reverts to its original value. In this state the first sensor 7a is completely straight.

In the meantime, the second sensor 7b has begun to deform at time t4. This deformation process does not take place suddenly when the sensor 7b reaches the wheel contact area A but begins a little before due to the deformation of the tire 3. Signal Sb of the second sensor also reaches a maximum (t5) and then reverts back to its original value (t6). While moving through the wheel contact area A, both signals Sa and Sb remain unchanged, since the sensor is not deformed here.

At a time t7, the first sensor 7a leaves the region of the wheel contact area A and changes further from a straight line into an arc shape. Since the change in curvature is now in the opposite direction to the change in curvature occurring when the wheel contact area A is entered, the signal Sa is deflected in the reverse direction, downwards in FIG. 5. The sensor 7a is not bent at all inside the region of the wheel contact area A, is slightly bent outside the wheel contact area A and is sharply bent in a transition area. At time t8 the signal Sa therefore reaches a negative maximum and then goes back to its original value at time t9. The signal Sb has the same curve but offset in time (t10-t12).

The rotational direction of the wheel 1 can now be determined from the phase-shift of the signals Sa and Sb. In the rotational direction C shown, the signal curve is obtained as illustrated in FIGS. 2A, 2B. In the reverse rotational direction, the signal Sb of the second sensor 7b runs ahead of the first signal Sa of the first sensor 7a.

The signals Sa and Sb and in particular their phase-shift are now analyzed in an evaluation unit 8 and the rotational direction of the wheel 1 is determined therefrom. The result can be output in the form of an analog signal, i.e. "0" for no rotation, "positive voltage level" for rotation to the right and "negative voltage level" for rotation to the left. Of course, output of a digital signal is also possible, for example "00" for no rotation, "01" for rotation to the left and "10" for rotation to the right. To save one bit, the detection of the state "no rotation" can be dispensed with. The binary signal would then be "0" for rotation to the left and "1" for rotation to the right. The evaluation unit 8 in the example shown is directly located in the rotational direction detector 6. This is not, however, obligatory since the evaluation unit 8 can also be located for example in the rim 2 or even in the vehicle 1.

Figure 6:
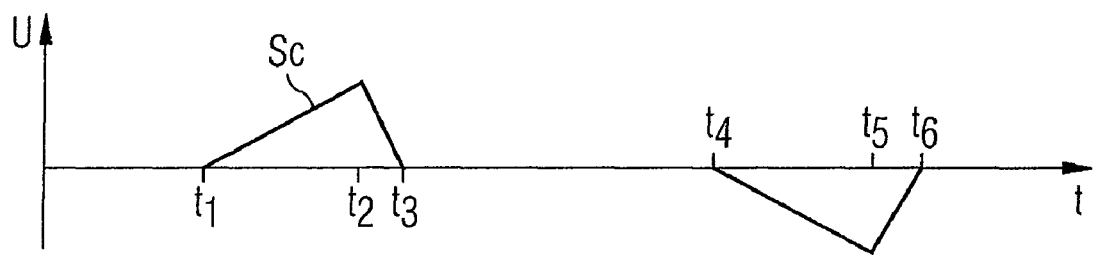
FIG. 6 is a graph showing a sensor signal curve for the rotational direction detector according to FIG. 4.

FIG. 6 finally shows the curve of the signal of the sensor 7c during rotation 1 of the wheel illustrated in FIG. 1. When the wheel 1 is rotated about the axle 4, the wheel segment B again reaches the wheel contact area A at a time t1. At this time t1 a deformation of the sensor 7c from an arc shape into a straight-line begins. Since firstly the narrow side of the sensor 7c is deformed and the electrical voltage output by a piezo crystal is proportional to the deformed volume, the rising edge of the signal Sc is now less steep than that of the signal Sa or Sb. At a time t2, a maximum is again reached, after which the signal returns quickly, i.e. with a steep negative gradient to an original value (t3).

At a time t4, the sensor 7c begins to leave the wheel contact area A which is why signal Sc slowly progresses toward a negative maximum due to the first occurring narrow side (t5). Finally the signal Sc returns to its original value relatively quickly (t6).

The direction of rotation C can now be determined again from the type of gradient. If the wheel 1 is rotated as shown in FIG. 1 and the sensor 7c is mounted in the location as illustrated in FIGS. 3A, 3B, a strong signal variation follows a weak one and the signal curve of Sc corresponds to that shown in FIGS. 4A, 4B. If the rotational direction C is now changed, a weak signal change follows a strong one. From signal curve Sc therefore the rotational direction C can be concluded even with only one sensor 7c. This curve is analyzed in an evaluation unit 8 and from this—as already mentioned in FIGS. 1, 2A and 2B—a rotational direction signal is derived and output therefrom.

Here it is noted that the signal curves Sa-Sc are strongly idealized to be able to better explain the fundamental way they operate. Furthermore, it is also mentioned that the signal Sa-Sc can also assume another value in a rest position of the sensor 7a, 7c. This is the case for example in biased, changeable resistors and capacitors.

Advantageously deformation energy converted from a piezo crystal into electrical energy can also be used for supply of energy since the surface under the signals Sa, Sb or Sc corresponds to the converted, available electrical energy. In principle, two possibilities emerge for this. Either the evaluation unit 8 has a special energy supply or it is provided by piezos.

A battery would then no longer be required at all. It is however also possible to support an available battery, for example charge a condenser which ensures the energy supply over a defined time span. In this case due to the changing polarity of the voltage produced by the piezos a rectifier can also be provided.

Of course the present invention is not limited to piezo sensors but can also be applied to other signal detectors. Here to name a few for example—microcontacts, variable resistors, variable capacitors or collision sensors. However, the principle always remains the same for example when the circumferential segment B enters and/or leaves or moves into the wheel contact area A, a change in its output signal occurs.

This is directly evident with microcontacts. Here, a simple switch contact is built into the tires 1 such that it opens or closes with the road surface 5 when the circumferential segment B contacts the road surface 5 depending on the configuration of the contact. In this case two microcontacts will be integrated in the rotational direction detector 6 in order to detect the rotational direction C.

Examples of capacitive sensors or resistance sensors would be for example two electrodes separated from one another by a dielectric or a resistance layer. When subjected to pressure, i.e. when the circumferential segment B contacts the road surface 5, the electrodes approach each other and alter the capacity and/or resistance of the sensor. This can be easily picked up with the aid of an applied dc or ac voltage.

In an accelerometer, advantage is taken of the fact that within the wheel contact area A no acceleration forces except centrifugal forces are caused by the rotation of the wheel 1. The output signal of an accelerometer arranged on the circumference of the wheel 1 changes when entering and/or leaving the wheel contact area A. It should be noted that the accelerations caused by the rotation of the wheel 1 are additionally overridden by the gravitational acceleration and accelerations when the vehicle speed changes.

In the process of the constant miniaturization of electronic and electromechanical components, it is also pointed out that electromechanical sensors obviously can also be manufactured in MEMS technology known per se.

The invention claimed is:

1. A rotational direction detector provided for mounting to a circumferential segment of a wheel, the rotational direction detector comprising:
   at least one sensor, wherein a change in an output signal of said sensor occurs when the circumferential segment at least one of enters and leaves a wheel contact area; and
   said at least one sensor is a single sensor which has a characteristic in a mounted state of the rotational direction detector which varies along a circumferential direction.

2. The rotational direction detector according to claim 1, wherein said at least one sensor outputs a changeable signal when moving through the circumferential segment of the wheel contact area.

3. The rotational direction detector according to claim 1, wherein said at least one sensor is one of at least two identical sensors which lie behind one another in a circumferential direction in a mounted state of the rotational direction detector.

4. The rotational direction detector according to claim 3, further comprising an evaluation unit which processes signals of said sensors and derives therefrom a rotational direction signal.

5. The rotational direction detector according to claim 1, wherein said at least one sensor is embodied such that said sensor converts deformation energy into electrical energy when at least one of entering, leaving, and moving through the wheel contact area.

6. The rotational direction detector according to claim 1, wherein said sensor is an element selected from the group consisting of microcontacts, variable resistors, variable capacitors, piezo elements, accelerometers and collision sensors.

7. The rotational direction detector according to claim 1, wherein said sensor is one of a plurality of sensors having different designs.

8. The rotational direction detector according to claim 7, further comprising an evaluation unit which processes signals of said sensors and derives therefrom a rotational direction signal.

9. A method for determining a rotational direction of a wheel, which comprises the steps:
   determining a signal change of at least one sensor disposed on a circumferential segment which occurs due to the circumferential segment at least one of entering and leaving a wheel contact area in which the circumferential segment of the wheel contacts a road surface;
   deriving a rotational direction signal from the signal of the at least one sensor; and
   pulse-shaping the signal of the sensor, its absolute value having different gradients for rising and falling signal edges which are used to determine the rotational direction.

10. The method according to claim 9, which further comprises phase-shifting signals of two sensors, the phase-shifting being used to determine the rotational direction.

11. A rotational direction detector provided for mounting to a circumferential segment of a wheel, the rotational direction detector comprising:
   at least one sensor, wherein a change in an output signal of said sensor occurs when the circumferential segment at least one of enters and leaves a wheel contact area in which the circumferential segment of the wheel contacts a road surface; and
   said at least one sensor is a single sensor which has a characteristic in a mounted state of the rotational direction detector which varies along a circumferential direction.

* * * * *